(12) United States Patent
Perrie et al.

(10) Patent No.: US 9,915,953 B2
(45) Date of Patent: Mar. 13, 2018

(54) METHOD AND A DEVICE FOR AIDING PILOTING OF AN AIRCRAFT DURING AN APPROACH PHASE FOR LANDING

(71) Applicant: Airbus Operations (S.A.S.), Toulouse (FR)

(72) Inventors: Jean-Damien Perrie, Toulouse (FR); Jean Muller, Tournefeuille (FR); Daniel Zapata-Arenas, Toulouse (FR); Sylvain Raynaud, Cornebarrieu (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 168 days.

(21) Appl. No.: 14/482,657

(22) Filed: Sep. 10, 2014

(65) Prior Publication Data

US 2015/0081144 A1 Mar. 19, 2015

(30) Foreign Application Priority Data

Sep. 13, 2013 (FR) ...................... 13 58855

(51) Int. Cl.
*G05D 1/06* (2006.01)

(52) U.S. Cl.
CPC .................. *G05D 1/0676* (2013.01)

(58) Field of Classification Search
CPC ........ G08G 5/02; G05D 1/0676; G05D 1/042; G05D 1/00
See application file for complete search history.

(56) References Cited

U.S. PATENT DOCUMENTS

| 8,112,188 B2 | 2/2012 | Rouquette et al. |
| 8,818,582 B2 | 8/2014 | Neri et al. |
| 9,082,302 B2 | 7/2015 | Dulac |
| 2012/0215386 A1 | 8/2012 | Louise et al. |

FOREIGN PATENT DOCUMENTS

| EP | 2282174 A2 | 2/2011 |
| EP | 2523176 A1 | 11/2012 |
| EP | 2573586 A1 | 3/2013 |
| FR | 2897712 A1 | 8/2007 |

OTHER PUBLICATIONS

Wikipedia article, Instrument landing system, printed Feb. 7, 2016.*
Dave Nakamura, RNP to ILS Action Team Report, Mar. 28, 2010, FAA, Performance-based Operations Aviation Rulemaking Committee (PARC).*
French Search Report for Application No. 1358855 dated May 23, 2014.

* cited by examiner

*Primary Examiner* — Kimberly S Berona
*Assistant Examiner* — Alan D Hutchinson
(74) *Attorney, Agent, or Firm* — Jenkins, Wilson, Taylor & Hunt, P.A.

(57) ABSTRACT

A method and device for aiding piloting of an aircraft during an approach phase for the purpose of landing. The device includes a guidance system for guiding the aircraft according to a first guidance mode during an initial phase upstream of a transition point, then guiding the aircraft according to a second guidance mode during a terminal phase between the transition point and the landing, the device further including a computing system for automatically computing the coordinates of the transition point, the guidance system also configured for automatically disabling the second guidance mode upstream of the transition point.

20 Claims, 3 Drawing Sheets

METHOD AND A DEVICE FOR AIDING PILOTING OF AN AIRCRAFT DURING AN APPROACH PHASE FOR LANDING

CROSS-REFERENCE TO RELATED APPLICATION

This application claims priority to French Patent Application No. 13 58855 filed on Sep. 13, 2013, the entire content of which is incorporated by reference herein.

DESCRIPTION

Technical Field

The present disclosure relates to a method and a device for aiding the piloting of an aircraft during an approach phase for the purpose of landing.

Background

During an approach for the purpose of landing, certain aircraft follow a first so-called "performance" navigation mode, of PBN (Performance Based Navigation) type, during a first phase; then in a second phase, these aircraft are guided with approach systems of x-LS (x-Landing System) type.

The PBN mode is a type of navigation that defines operations with respect to specified performance levels that include lateral navigation and vertical navigation. For the lateral navigation, a concept of RNP (Required Navigation Performance) corridor is defined. This involves a surface that extends on both sides of the nominal trajectory inside which the aircraft has to stay with a determined probability. In particular, an accuracy corridor is known with a width of 2×RNP, in which the aircraft has to stay 95% of the time in nominal flight conditions, as well as a containment corridor with a width of 4×RNP, which is associated with a probability of leaving the corridor, by approach either in nominal conditions or in the event of a breakdown, of $10^{-5}$ or $10^{-7}$ according to the navigation specification. In these corridors, the term RNP corresponds to a value of the accuracy requirement. For the vertical navigation, a so-called BaroV-NAV corridor is defined on the segments where the aircraft is locked on to a vertical reference profile. The vertical requirements only relate to an accuracy corridor. This is a surface that extends above and below the nominal trajectory in which the aircraft has to stay for 99.7% of the time with no breakdown. The half-height of this corridor corresponds to a VTSE (Vertical Total System Error) value required for BaroVNAV operations.

Furthermore, x-LS navigation is based on a mode of angular guidance of the aircraft using a horizontal beam and a vertical beam. The intersection of these beams represents the trajectory along which the aircraft must be guided to the runway in an adequate manner for a safe landing. The beams can be physically defined by radio signals transmitted from ground stations or can be virtually reconstructed onboard from information contained in a navigation database. The x-LS modes used are, for example, an instrument approach mode relating to a system of ILS (Instrument Landing System) type, an instrument approach mode relating to a microwave landing system of MLS (Microwave Landing System) type or to an instrument approach mode relating to a GPS landing system of GLS (GNSS Landing System, GNSS meaning Global Navigation Satellite System) type.

A need therefore exists for a function to be available that would make it possible to carry out hybrid approaches that combine the flexibility and the performance of an RNP trajectory and the minima of x-LS type on landing, and notably to carry out an automatic transition from a slaving to the PBN flight plan to a slaving to the x-LS beams. Furthermore, certain x-LS modes allow automatic landing, such as the ILS mode for example.

To achieve this, it is necessary to define a characteristic point of so-called transition, which indicates to the aircraft the switch from the PBN guidance mode in the initial phase, to the x-LS guidance mode in the terminal phase.

However, this transition point must be able to be adapted to all the situations that the aircraft encounters, and in particular to all the existing x-LS approach modes. But no method or device exists to date that is capable of defining it onboard an aircraft. The only known possibility is to store in a database a point normalized for all approaches, which would however not be suitable for all approach situations.

SUMMARY

An object of the present disclosure is to remedy this drawback, and comprises a method allowing the aircraft to carry out an automatic transition between any PBN navigation mode to any x-LS approach mode, and this whatever the approach trajectory.

More precisely, it relates to a method for aiding the piloting of an aircraft during an approach phase for the purpose of landing, the approach phase relating to at least one of the following planes: a lateral plane and a vertical plane and comprising:
  an initial phase upstream of a transition point, during which the aircraft is guided into at least one flight corridor according to a predetermined flight plan, while observing navigation and guidance performance constraints; and
  a terminal phase between the transition point and the landing during which the aircraft is guided along at least one guidance beam.

According to the disclosure the method comprises guiding the aircraft according to a first guidance mode during the initial phase up to the transition point, then in guiding the aircraft according to a second guidance mode during the terminal phase from the transition point onwards, it is noteworthy in that it also comprises the following, implemented automatically:
  computing the coordinates of the transition point making it possible to switch from the initial phase to the terminal phase; and
  disabling, during the approach, the second guidance mode upstream of the transition point thus computed.

Thus, whatever the guidance mode of the initial phase and whatever that of the terminal phase, at least one transition point is defined automatically using a computation that is carried out onboard the aircraft. The transition point thus computed can be adapted to all approach phase situations, as specified below, which makes it possible to remedy the aforementioned drawback.

Furthermore, owing to the disabling of the second guidance mode up to the transition point, premature switches of guidance mode are avoided. Even if the aircraft receives a signal of x-LS type (relating to a second guidance mode), before the transition point, it will continue to operate a PBN guidance mode (first guidance mode) up to the transition point. Indeed, it can be necessary to follow a flight corridor defined and published in a PBN guidance mode, up to a certain point before changing guidance mode and trajectory.

According to various embodiments of the disclosure, which may be taken individually or in combination:
  the method comprises computing a convergence trajectory to rejoin the guidance beam from the transition point onwards, if the guidance beam is not detectable by the aircraft during the approach, from the transition point onwards, or if the conditions of engagement of a guidance mode of x-LS type are not met, the aircraft being guided along this convergence trajectory;

the transition point is arranged on the last segment of the flight plan before the capture of the guidance beam;

the guidance beam is a lateral guidance beam, and the transition point is a lateral transition point defined in the lateral plane;

if the envelope of the guidance beam lies entirely inside the flight corridor, the coordinates of the lateral transition point are computed by orthogonal projection on the flight plan of the point of intersection between an outer limit of the envelope of the guidance beam and an outer limit of the flight corridor;

if the envelope of the guidance beam does not lie entirely inside the flight corridor, the transition point is arranged at the end of the last segment of a profile in conformance with the flight plan followed during the initial phase, the profile comprising a plurality of successive segments;

the method comprises:
 computing a first lateral transition point for an accuracy corridor;
 computing a second lateral transition point for a containment corridor;
 selecting the lateral transition point that is closest to the landing runway as the lateral transition point to be used;

the guidance beam is a vertical guidance beam, and the transition point is a vertical transition point defined in the vertical plane;

the vertical transition point is arranged at the start of a last segment of a profile in conformance with the flight plan followed during the initial phase;

the transition point is both a vertical transition point and a lateral transition point;

the transition point is arranged at the end of a last segment of a profile in conformance with the flight plan followed during the initial phase;

the triggering of vertical guidance relating to the second guidance mode is carried out after triggering lateral guidance relating to the second guidance mode.

The present disclosure also relates to a device for aiding the piloting of an aircraft during an approach phase for the purpose of landing.

The device of the type comprises a guidance system configured for guiding the aircraft according to a first guidance mode during the initial phase up to the transition point, then in guiding the aircraft according to a second guidance mode during the terminal phase from the transition point onwards, is noteworthy in that it also includes a computing system configured for automatically computing the coordinates of the transition point, and in that the guidance system is also configured for automatically disabling the second guidance mode upstream of the transition point during the approach.

BRIEF DESCRIPTION OF THE DRAWINGS

The disclosure also relates to an aircraft, particularly a transport aircraft, including such a piloting aid device.

The figures of the appended drawing will make it easier to understand how the disclosure can be produced. In these figures, identical reference numbers denote similar elements.

DETAILED DESCRIPTION

Figure 1:
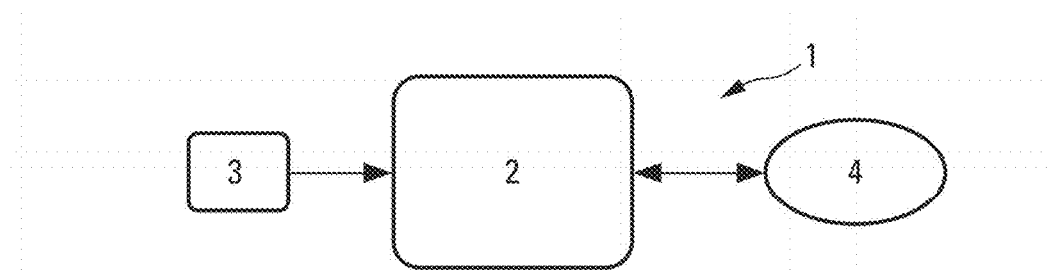
FIG. 1 is the block diagram of a device illustrating the disclosure.

The device 1 represented schematically in FIG. 1, which illustrates the disclosure, is a device for aiding the piloting of an aircraft 14, during an approach phase for the purpose of landing. It comprises a guidance system 2 and a computing system 3. The computing system 3 sends data to the guidance system 2 which gives command orders to conventional command means 4 for piloting the aircraft 14. This device 1 is embedded onboard the aircraft 14, particularly a transport aeroplane.

During a landing of the aircraft 14, the approach phase exhibits an initial phase P1 (FIGS. 2 and 5) upstream of a transition point 15, 27, during which the aircraft 14 is guided in a flight corridor 10 according to a predetermined flight plan 9, while observing the navigation and guidance performance constraints, and a terminal phase P2 downstream from the transition point 15, 27, between the transition point 15, 27 and the landing on a landing runway 8, during which the aircraft 14 is guided along at least one guidance beam.

The guidance system 2 is configured for guiding the aircraft 14 according to a first guidance mode during the initial phase P1 up to the transition point 15, 27, then according to a second guidance mode during the terminal phase P2 from the transition point 15, 27 onwards. According to the disclosure, the guidance system 2 disables the second guidance mode upstream of the transition point 15, 27.

The first guidance mode is a PBN mode as mentioned previously. Two types of specifications are known for navigation, specifications that express only performance requirements, classed as RNAV type, and specifications that also express monitoring and alert means onboard the aircraft 14, classed as RNP type. RNP specifications make it possible to use curved segments of RF (Radius to Fix) type in the initial or intermediate segments of the approach. Furthermore, PBN navigation specifications have RNP values lying between 0.1 and 1 NM for example.

The second navigation mode is an x-LS mode as mentioned previously. x-LS modes are for example of ILS, MLS, GLS, SLS, FLS, LOC/VNAV type or any other mode known to those skilled in the art. In a navigation mode of ILS or MLS type for example, one or more beacons send a lateral beam 33 called LOC (LOCalizer) to guide the aircraft 14 laterally, and a vertical beam 21 called G/S (Glide Slope) to guide the aircraft 14 vertically.

To switch from the PBN mode to the x-LS mode, the transition can be implemented over a straight portion of TF to TF (Track to Fix) type with all the PBN navigation specifications, or over a curved portion of RF to TF type with only the navigation specifications of RNP type.

It will be noted that the procedures and the applicability of PBN requirements are as follows:

- all the segments preceding the final approach segment can have an attributed PBN navigation specification;
- the final approach segment is only subject to criteria of the corresponding approach type, including its aircraft requirements and its applicable procedure design criteria. Consequently, there is no PBN requirement on a final approach of non-PBN type (for example ILS);
- the G/S capture manoeuvre made at the end of the intermediate segment is only subject to the PBN requirements in the case where these requirements extend to the final segment;
- if the interception of the LOC beam is made from a segment with a navigation specification of RNP type, this segment can be either straight (TF) or curved (RF);
- if the interception of the LOC beam is made from a PBN segment with a navigation specification of RNAV type, the segment can only be straight (TF).

According to the disclosure, the computing system 3 automatically computes the coordinates of the transition point 15, 27 and supplies them automatically to the guidance system 2 which uses them to command the automatic transition from the first guidance mode to the second guidance mode.

The transition point is arranged on the last segment of the flight plan before the capture of the guidance beam. Thus, the capture of the x-LS beam does not occur upstream of the capture zone defined by the published procedure. For a lateral beam, the aircraft 14 is in the accuracy "RNP corridor" (2×RNP) 95% of the time when it flies with the guidance mode associated with lateral navigation with respect to the flight plan (NAV mode). Knowing that the LOC* guidance mode can cause the aircraft 14 to move away from the trajectory of the flight plan towards the LOC beam, the disabling of a mode of capture of the LOC beam (called LOC* mode) and of a mode of following the LOC beam (called LOC mode) up to the point from which the LOC beam is entirely contained in the "RNP corridor", guarantees that the trajectory of interception of the LOC beam will be contained in the corridor. The PBN accuracy requirements are respected over all the segments of the approach to which they apply.

Figure 2:
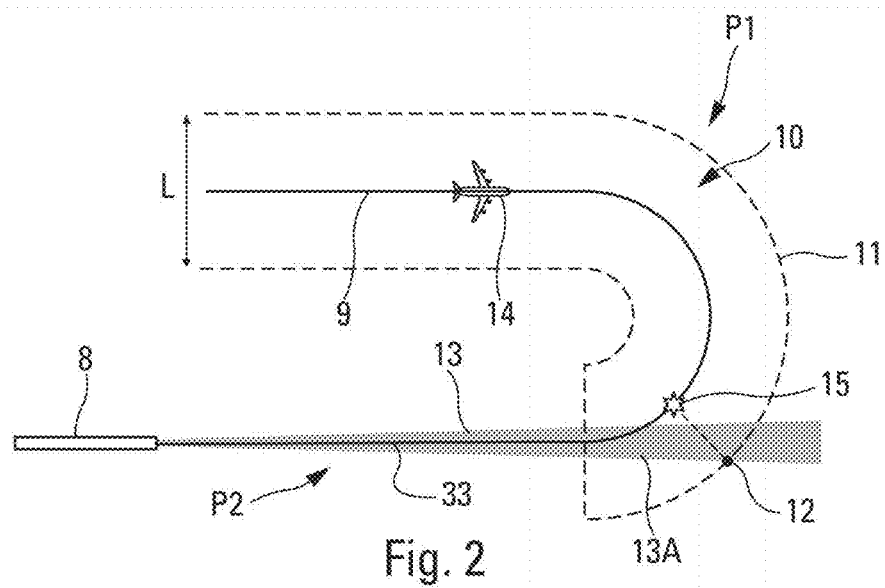
FIG. 2 is a representation from above illustrating the position of a lateral transition point on a curved segment of the trajectory of an aircraft.
Figure 3:
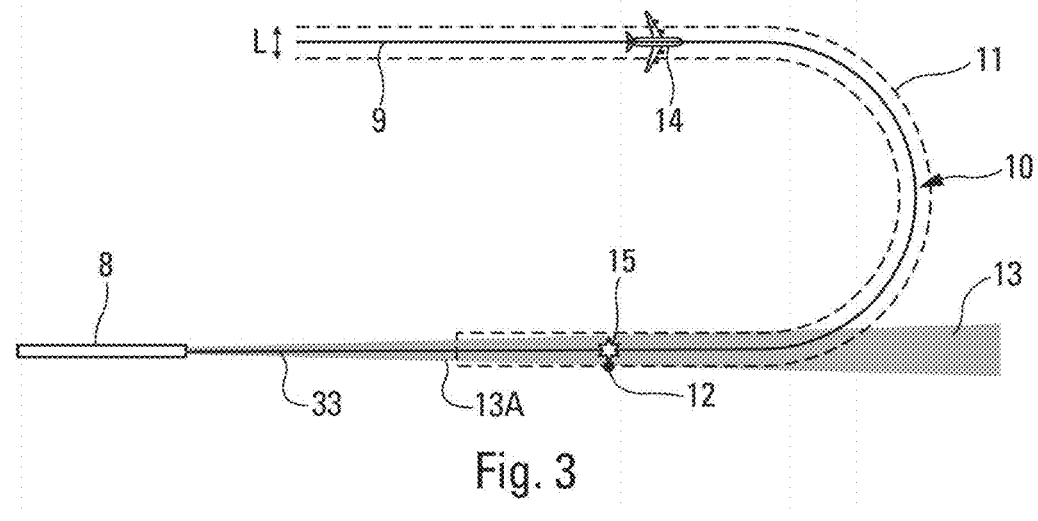
FIG. 3 is a representation from above illustrating the position of a lateral transition point on a straight segment of the trajectory of an aircraft.
Figure 4:
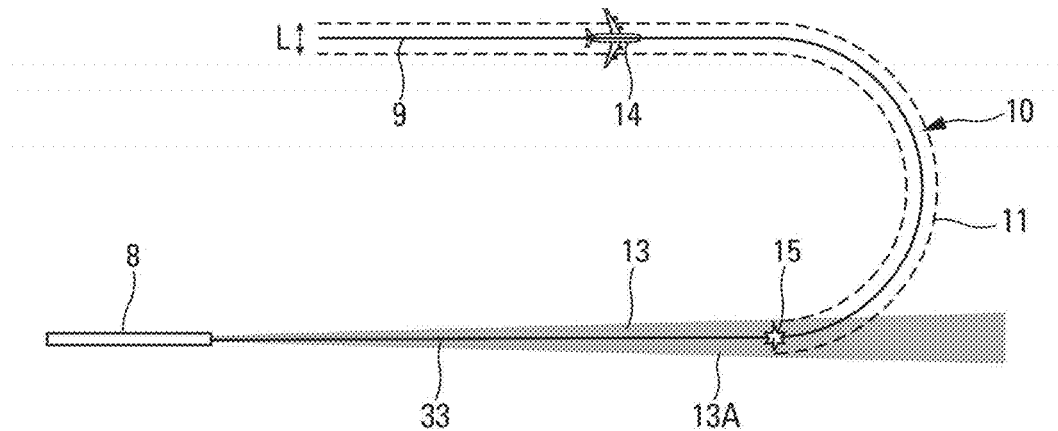
FIG. 4 is a representation from above illustrating the position of a lateral transition point for a flight corridor contained in a guidance beam envelope.

For a lateral guidance beam 33 represented in FIGS. 2 to 4, the transition point 15 is a lateral transition point defined in the lateral plane. Error terms can induce a discrepancy between the beam where the aircraft 14 would determine a LOC deviation equal to zero (actual LOC interpreted by the aircraft) and theoretical LOC beam. Two error terms contributing to this discrepancy are identified below: an error in the construction of the LOC beam (LCE for LOC Construction Error) and an error in the determination of the LOC deviation (LDE for LOC Deviation Error). An envelope 13 is defined corresponding to the TLE (for Total LOC Error) which comprises the two aforementioned errors.

The coordinates of the lateral transition point 15 are computed, as represented in FIG. 2, by orthogonal projection on the flight plan 9 of the point of intersection 12 between an outer limit 13A of the (error) envelope 13 of the guidance beam 33 and an outer limit 11 of the flight corridor 10 of width L. The coordinates of the lateral transition point 15 are computed in this way only if the envelope 13 of the beam 33 lies entirely inside the flight corridor 10.

For a curved last segment, the aircraft 14 making a turn with an RF-TF transition, the point of intersection 12 is at the outer limit 11 at the turning of the "RNP corridor", as represented in FIG. 2. For a straight last segment represented in FIG. 3, during a TF-TF transition, the point of intersection 12 is on one side of a straight segment of the flight corridor 10.

In the case where the envelope 13 of the beam 33 does not lie entirely inside the flight corridor 10, and where it is the flight corridor 10 that lies in the envelope 13 of the beam 33, as illustrated in FIG. 4, the transition point 15 is arranged at the end of the last PBN segment in conformance with the PBN flight plan 9, because no point of intersection exists. This can notably occur with the ILS or MLS modes.

In the case of an approach along a flight corridor 10 corresponding to a containment corridor, the computing system 3 computes a new lateral transition point 15 by applying the same method as that mentioned previously for an accuracy corridor. In this case, the containment corridor 9 is wider (4×RNP), and the value of the total error TLE has a probability associated with the containment corridor.

The lateral transition point 15 that is chosen by the guidance system 2 is that which is closest to the landing runway 8, between the transition point computed for a containment corridor and the transition point computed for an accuracy corridor. Thus, the PBN lateral containment requirements are observed as much in the nominal case for an accuracy of 95%, as in the event of a breakdown (integrity of $10^{-7}$) over all the approach segments where they apply.

Figure 5:
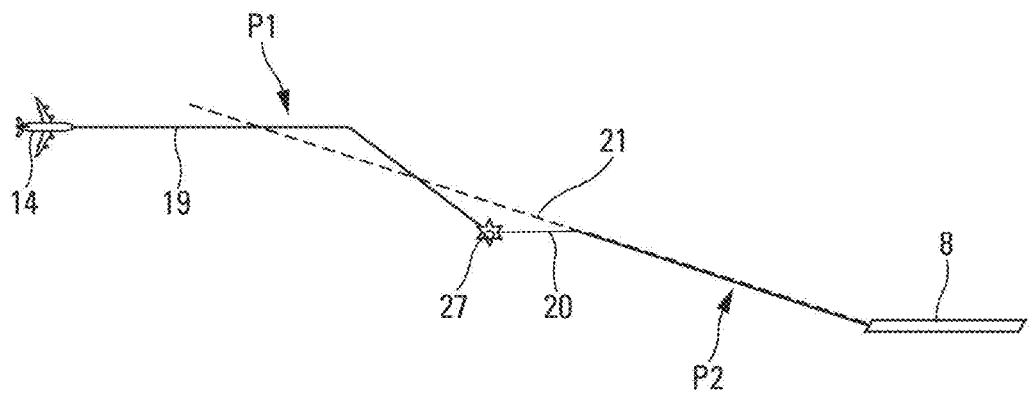
FIG. 5 is a side-on representation illustrating the position of a vertical transition point on the trajectory of an aircraft.

For a vertical guidance beam 21, represented in FIG. 5, the transition point is a vertical transition point 27 defined in the vertical plane. The aircraft 14 follows a flight plan 19 in PBN mode, and a vertical beam 21 is generated. The vertical transition point 27 is arranged at the start of the last segment 20 of the flight plan 19. Thus, the PBN accuracy requirements are observed over all the approach segments where they apply.

In another embodiment, not represented, the transition point is both a vertical transition point and a lateral transition point. This transition point is arranged at the end of the last segment of a profile in conformance with the PBN flight plan. The fact that the engagement of the x-LS modes is not allowed before the end of the PBN part implies that the capture of the LOC beam will be normally offset with respect to the preceding embodiment.

For both embodiments, the guidance system 2 computes a lateral 17 and/or vertical 28 convergence trajectory to rejoin the guidance beam 21, 33 from the transition point 15, 27 onwards, if the guidance beam 21, 33 is not detectable by the aircraft, from the transition point 15, 27 onwards, or if the conditions of engagement of a guidance mode of x-LS type are not met.

The behavior of the guidance modes associated with the capture of the LOC beam (LOC* mode) and with the following of the LOC beam (LOC mode) is as follows:

- if the LOC* mode is armed but the conditions of capture are not met, an auxiliary capture mode exists, a convergence mode guides the aircraft towards the LOC beam by commanding a rectilinear trajectory with an angle of convergence of 20°. The engagement of the LOC* mode can cause the aircraft to move away from the NAV trajectory to converge more quickly with the LOC beam;
- once the aircraft is established on the beam in LOC mode, the guidance error is negligible with respect to the width of the "RNP corridor";
- the engagement of the LOC* mode is necessary for the engagement of the G/S modes.

Figure 6:
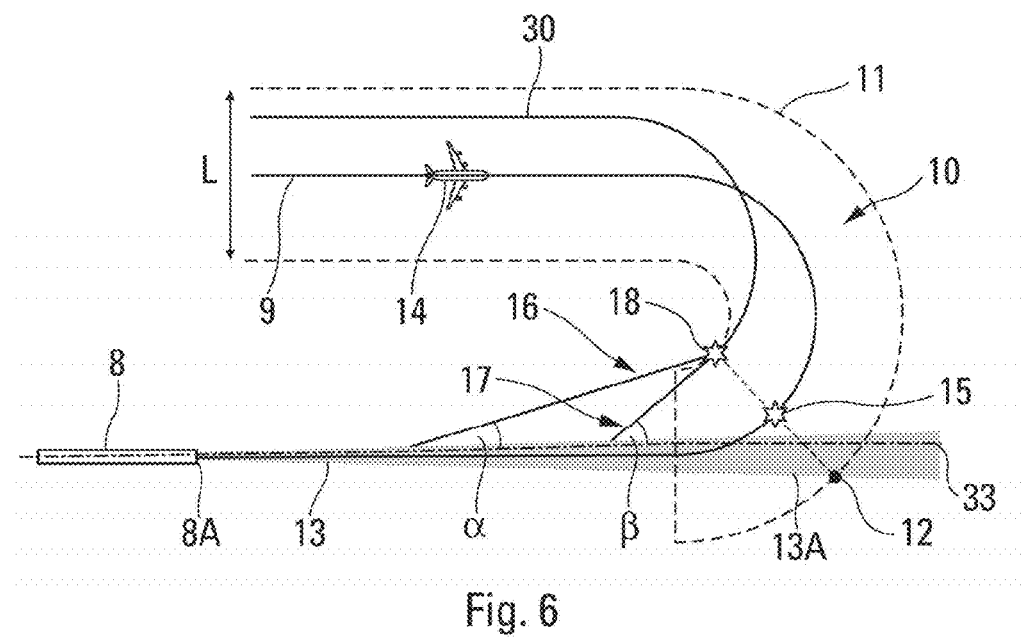
FIG. 6 is a representation from above illustrating the capture of a lateral beam by an aircraft.

Concerning the lateral guidance, represented in FIG. 6, the discrepancy between the actual position 18 of the aircraft 14 and the LOC beam 33 can be large enough that the conditions of engagement of the LOC* mode are not re-entered when disabling is reversed. Moreover, the geometry of the RF-TF transitions causes potential capture problems, because the RF segment brings the aircraft 14 parallel with the LOC beam. If the trajectory of the aircraft 14 after the removal of the disabling of the x-LS modes does not allow the engagement of the LOC* mode, a manoeuvre must be commanded to intercept the LOC beam 33, by implementing a guidance mode called convergence mode.

To trigger the convergence mode, the two following conditions A and B are taken into account:

The condition A is verified when, simultaneously:
the LOC mode is armed during at least 3 seconds and the LOC* mode does not engage;
a destination runway exists in the flight plan with an associated landing procedure of LOC, ILS, MLS, GLS, IGS, LDA, SDF type;
the NAV mode is engaged;
the frequency (or LS channel) selected is equal to that associated with the destination runway; and
the aircraft is at least 20 NM from the LOC station.

Condition B is verified when the following relationship is satisfied: |TKAC+0.7*PHI−TKLOC|>20°, in which:
TKAC is the current route of the aircraft 14;
PHI is the current angle of roll of the aircraft 14; and
TKLOC is the course of the LOC beam of the selected approach.

If the conditions A and B are met, the current guidance mode is kept until the LOC* mode engages.

If the condition A is met but the condition B is not, the aircraft 14 captures and keeps a specified route until the LOC* mode engages. This route is defined as follows: TKSEL=TKLOC+EPS*20°, where EPS=+1 if LOC DEV≥0 and EPS=−1 if LOC DEV<0.

If the condition A is not met, the process continues.

Consequently, considering that the condition A is met, three different situations exist in which the aircraft 14 can be found when the disabling is reversed:
if the aircraft 14 satisfies the conditions of engagement of the LOC* mode, the LOC* mode is engaged;
if the aircraft 14 does not satisfy the conditions of engagement of the LOC* mode but satisfies the convergence condition (the condition B is met), the aircraft 14 continues in NAV mode following the flight plan until the engagement of the LOC* mode;
if the aircraft 14 does not satisfy the conditions of engagement of the LOC* mode or the convergence condition (the condition B is not met), the convergence mode is activated after a predetermined time interval (of 3 seconds for example).

Concerning the convergence mode, it will be noted that it does not apply to approaches for which the SLS or FLS modes are used. A first change consists in modifying the aforementioned condition A to include all the approach modes associated with an x-LS function.

The computing of the lateral transition point takes as hypothesis that the LOC* mode can only make the aircraft 14 deviate from the trajectory NAV to make the aircraft 14 converge more quickly with the LOC beam 33. Due to this fact, the behaviour of the convergence mode must also be in conformance with this hypothesis. On the other hand, the convergence mode can command the interception trajectory at 20° when the angle of the NAV trajectory is still above 20°, which would make the aircraft 14 diverge from the trajectory of the flight plan.

The law of the convergence mode is modified to ensure an angle of interception, always equal to or above the current angle of the NAV trajectory. The modification is involved in the definition of the TKSEL term of the logic presented previously:

TKSEL=TKLOC+EPS*MAX(20°;|TKAC−TKLOC|)

With this modification, the law of the convergence mode ensures the capture of the LOC beam while observing the validity of the lateral transition point for the observance of the "RNP corridor".

Thus, in FIG. 6, when the aircraft 14 arrives at the actual position 18 following the actual flight trajectory 30 instead of the trajectory 9, it rejoins the LOC beam 33 more quickly, following the segment 17 with an angle β between the beam 33 and the segment 17, above 20° thanks to the modified LOC convergence mode. With a conventional LOC convergence mode, the aircraft would have followed the segment 16 with an angle α of 20° between the beam 33 and this segment 16. Consequently, the capture of the LOC beam 33 occurs sufficiently upstream of the threshold 8A of the runway 8.

Figure 7:
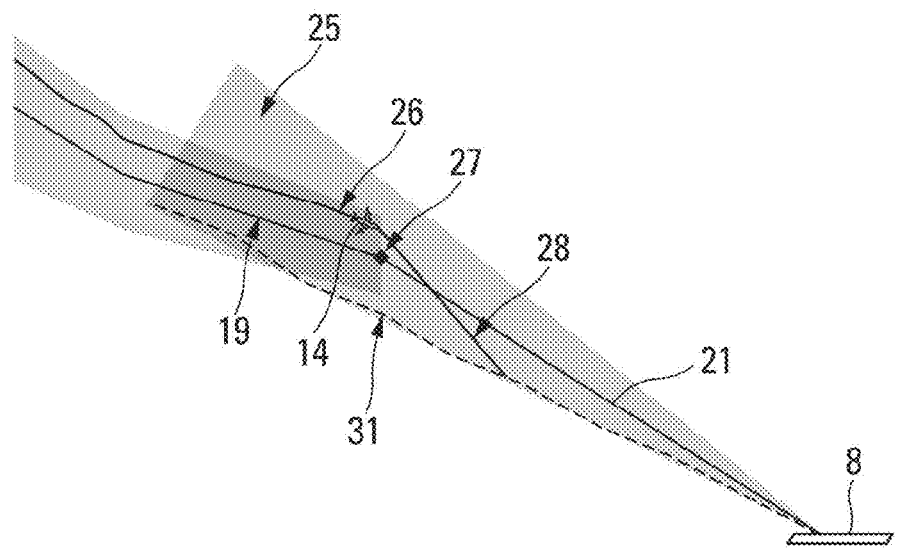
FIG. 7 is a side-on representation illustrating the capture of a vertical beam by an aircraft.

Concerning the transition in vertical navigation represented in FIG. 7, a vertical beam of G/S type is generated in the vertical plane. Discrepancies can exist between the actual vertical profile 26 flown by the aircraft 14 and the profile of the flight plan 19, as well as between a published G/S beam 21 and a beam 31 that the aircraft 14 would determine with a G/S deviation equal to 0. These discrepancies can prevent the appropriate capture of the G/S beam as a function of the geometry of the procedure. The vertical profile during the PBN navigation can be different from the nominal profile because of two main effects:
a total error of the BaroVNAV system (of VTSE for "Vertical Total System Error" type); and
an error due to atmospheric conditions differing from those of the standard atmosphere ISAD (for International Standard Atmosphere Deviation), particularly because of a temperature difference.

As for the lateral transition, a discrepancy can exist between the published G/S beam 21 and the beam G/S 31 as interpreted by the aircraft 14, composed of the following error terms:
an error in the construction of the G/S beam (of GCE for "G/S Construction Error" type), and
an error in the determination of the G/S deviation (of GDE for "G/S Deviation Error" type).

The envelope 25 of the published G/S beam 21 takes into account the total error TGE (for Total G/S Error), which comprises the two preceding errors.

To ensure that the G/S beam is captured sufficiently upstream of the runway 8 for automatic landings, the G/S guidance mode must be engaged at the latest at a height of 1000 feet with respect to the runway 8.

Furthermore, the convergence mode commands, from the transition point 27 onwards, a trajectory 28 converging more rapidly towards the G/S beam 31, when the following conditions are simultaneously met:
the LOC* guidance mode is engaged,
the G/S guidance mode is armed,
the engagement of the G/S guidance modes is authorized, and the nominal point of capture of the G/S beam is passed through without engagement of the G/S* mode, which is the usual mode of capture.

Thus, a trajectory 28 converging towards the G/S beam 31 is commanded with a slope between 0° and −6°, as a function of the angle of the published G/S beam, of the measured G/S deviation and of the capacity of energy loss of the aircraft 14. In particular, if the aircraft 14 is below the G/S beam 31, the commanded angle of descent is less than that of the G/S beam, whereas if the aircraft 14 is above the G/S beam 31, the angle will be above that of the G/S beam.

This makes it possible to ensure the capture of the G/S beam at an adequate height even if the normal mode of G/S* capture is not engaged when starting the final approach segment.

In all cases, the triggering of the vertical navigation according to the guidance mode x-LS is carried out after the triggering of the lateral navigation.

The invention claimed is:

1. A method for aiding piloting of an aircraft during an approach phase for landing, the approach phase relating to at least one of a lateral plane and a vertical plane and comprising:
    an initial phase upstream of a transition point, during which the aircraft is guided into at least one flight corridor according to a predetermined flight plan while observing navigation and guidance performance constraints; and
    a terminal phase between the transition point and a landing runway during which the aircraft is guided along at least one guidance beam which originates from at least one ground station,
the method comprising:
    guiding the aircraft according to a first guidance mode during the initial phase up to the transition point;
    guiding the aircraft according to a second guidance mode during the terminal phase from the transition point onwards;
    automatically computing coordinates of the transition point making it possible to switch from the initial phase to the terminal phase; and
    automatically disabling, during the approach phase, the second guidance mode upstream of the transition point thus computed.

2. The method according to claim 1, further comprising computing, when the at least one guidance beam is not detected by the aircraft during the approach phase, a convergence trajectory to join the at least one guidance beam from the transition point onwards and guiding, when conditions of engagement of a guidance mode of x-LS type are not met, the aircraft along this convergence trajectory.

3. The method according to claim 1, wherein the transition point is arranged on a last segment of the flight plan before a capture of at least one guidance beam.

4. The method according to claim 1, wherein the at least one guidance beam comprises a lateral guidance beam and the transition point comprises a lateral transition point defined in the lateral plane.

5. The method according to claim 4, comprising computing, when an envelope of the at least one guidance beam lies entirely inside the flight corridor, coordinates of the lateral transition point by orthogonal projection on the flight plan of a point of intersection between an outer limit of the envelope of the at least one guidance beam and an outer limit of the flight corridor.

6. The method according to claim 4, wherein, when an envelope of the at least one guidance beam does not lie entirely inside the flight corridor, the transition point is arranged at an end of a last segment of a profile in conformance with the flight plan followed during the initial phase, the profile comprising a plurality of successive segments.

7. The method according to claim 1, further comprising:
    computing a first lateral transition point for an accuracy corridor;
    computing a second lateral transition point for a containment corridor; and
    selecting the first or second lateral transition point closest to the landing runway as the transition point to be used.

8. The method according to claim 1, wherein the at least one guidance beam comprises a vertical guidance beam and the transition point comprises a vertical transition point defined in the vertical plane.

9. The method according to claim 8, wherein the vertical transition point is arranged at a start of a last segment of a profile in conformance with the flight plan followed during the initial phase.

10. The method according to claim 1, wherein the transition point comprises both a vertical transition point and a lateral transition point.

11. The method according to claim 10, wherein the transition point is arranged at an end of a last segment of a profile in conformance with the flight plan followed during the initial phase.

12. The method according to claim 1, comprising triggering of vertical guidance relating to the second guidance mode after triggering lateral guidance relating to the second guidance mode.

13. A device for aiding piloting of an aircraft during an approach phase for landing, the approach phase comprising:
    an initial phase upstream of a transition point, during which the aircraft can be guided into at least one flight corridor according to a predetermined flight plan while observing navigation and guidance performance constraints; and
    a terminal phase between the transition point and a landing runway during which the aircraft can be guided along at least one guidance beam,
wherein the device is located onboard the aircraft and comprises:
    a guidance system configured to guide, during the initial phase, the aircraft according to a first guidance mode, then to guide, during the terminal phase, according to a second guidance mode; and
    a computing system configured to automatically compute coordinates of the transition point,
    wherein the guidance system is also configured to automatically disable the second guidance mode upstream of the transition point during the approach phase.

14. The device according to claim 13, wherein the computing system is configured, when the at least one guidance beam is not detectable by the aircraft during the approach phase, to compute a convergence trajectory to join the at least one guidance beam from the transition point onwards and the guidance system is configured, when conditions of engagement of a guidance mode of x-LS type are not met, to guide the aircraft along this convergence trajectory.

15. The device according to claim 13, wherein the transition point is arranged on a last segment of the flight plan before a capture of at least one guidance beam.

16. The device according to claim 13, wherein the at least one guidance beam comprises a lateral guidance beam and the transition point comprises a lateral transition point defined in the lateral plane.

17. The device according to claim 16, wherein, when an envelope of the at least one guidance beam lies entirely inside the flight corridor, the computing system is configured to compute coordinates of the lateral transition point by orthogonal projection on the flight plan of a point of intersection between an outer limit of the envelope of the at least one guidance beam and an outer limit of the flight corridor.

18. The device according to claim 16, wherein, when an envelope of the at least one guidance beam does not lie entirely inside the flight corridor, the transition point is arranged at an end of a last segment of a profile in conformance with the flight plan followed during the initial phase, the profile comprising a plurality of successive segments.

19. The device according to claim 13, wherein the computing system is configured to:
   compute a first lateral transition point for an accuracy corridor;
   compute a second lateral transition point for a containment corridor; and
   select the first or second lateral transition point that is closest to the landing runway as the transition point to be used.

20. An aircraft comprising a device according to claim 13.

* * * * *